United States Patent [19]

Henein

[11] Patent Number: 4,867,115

[45] Date of Patent: Sep. 19, 1989

[54] CRANKING FUEL CONTROL METHOD AND APPARATUS FOR COMBUSTION ENGINES

[75] Inventor: Naeim A. Henein, Grosse Pointe Shores, Mich.

[73] Assignee: Wayne State University, Detroit, Mich.

[21] Appl. No.: 924,613

[22] Filed: Oct. 29, 1986

[51] Int. Cl.$^4$ .................................... F02M 39/00
[52] U.S. Cl. ............................ 123/179 L; 123/501
[58] Field of Search .............. 123/179 L, 500, 501

[56] References Cited

U.S. PATENT DOCUMENTS

| | | | |
|---|---|---|---|
| 4,401,079 | 8/1983 | Aoki | 123/179 L |
| 4,438,748 | 3/1984 | Ikeura | 123/179 L |
| 4,492,206 | 1/1985 | Hasegawa | 123/179 L |
| 4,541,390 | 9/1985 | Steinbrenner | 123/179 L |
| 4,582,036 | 4/1986 | Kiuchi | 123/179 L |
| 4,635,603 | 1/1987 | Hara | 123/179 L |

OTHER PUBLICATIONS

Sae Technical Paper Series—"Starting of Diesel Engines: Uncontrolled Fuel Injection Problems", Naeim A. Henein–Wayne State University.

Primary Examiner—Carl Stuart Miller
Attorney, Agent, or Firm—Arnold S. Weintraub; Gerald R. Black

[57] ABSTRACT

A cranking fuel control method and apparatus for combustion engines. The method includes the steps of delaying the injection of fuel to the engine until one or more of the operating parameters of the engine, such as the engine rotational speed, the crankshaft rotation angle or the cylinder gas combustion pressure has reached a predetermined value. The fuel is then injected into the cylinder(s) at the required quantity for optimum starting of the engine. The method and apparatus can be used in fuel pumps with mechanical governors or with engines having electronic fuel controls.

15 Claims, 4 Drawing Sheets

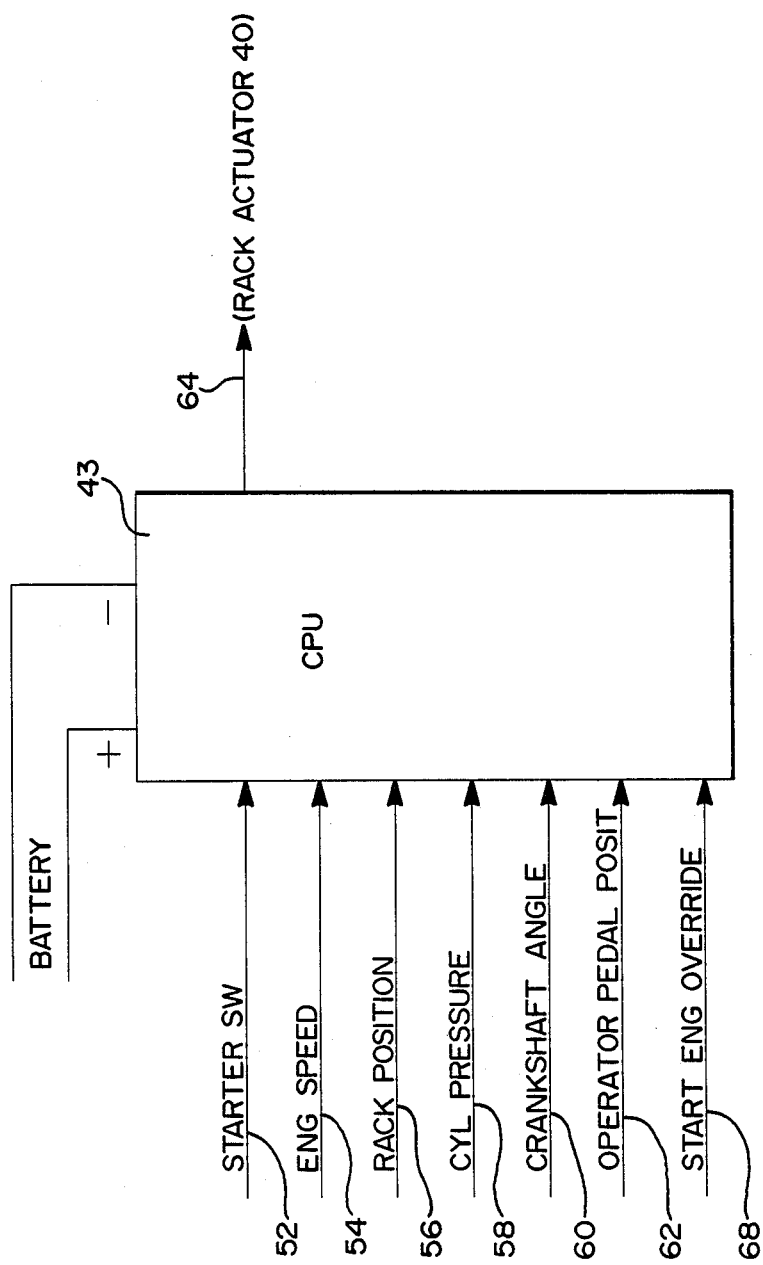

CRANKING FUEL CONTROL METHOD AND APPARATUS FOR COMBUSTION ENGINES

BACKGROUND OF THE INVENTION

1. Field of the Invention:

The present invention relates, in general, to combustion engines and, more specifically, to a cranking fuel control method and apparatus for reducing the emissions of particulates and gases from the engine during starting.

2. Description of the Prior Art:

Fuel injection systems have been designed for use in many different types of internal combustion engines, particularly, diesel engines, to improve the cold startability of such engines. Such systems operate by injecting relatively large amounts of fuel immediately upon the start of engine cranking into the engine. For example, in a diesel engine, the quantity of fuel injected during cranking is usually close to or in excess of the amount of fuel injected into the combustion chamber(s) of the engine at full operating load of the engine.

However, such fuel injection systems have many deficiencies caused by the fuel injected during cranking and starting of the engine. Such problems are related to the emission of high amounts of unburned hydrocarbons or fuel, liquid and solid particulates, and white smoke from the engine. Other problems are related to an increase in wear as a result of the dilution of the lubricating oil with the fuel, and in some engines, due to the high peak combustion gas pressures reached upon combustion after misfiring at the relatively low rotating speeds and the lack of formation of a lubricating oil film between the interacting surfaces of the engine components.

Many devices and methods have been devised to alleviate the problem of starting combustion engines, particularly on off-specification fuels or under cold ambient conditions. For example, in diesel engines some of these approaches include the use of compression ratios higher than the optimum compression ratio for a particular engine, the use of a glow plug in indirect injection engines, the use of air pre-heaters, and the injection of excessive amounts of fuel during cranking. All of these approaches enhance the formation of a combustible mixture of fuel-vapor and air at a temperature high enough to produce ignition and the subsequent combustion oxidation reactions. The oxidation reactions should release the energy required to produce work needed to overcome the engine frictional losses and accelerate the engine from the cranking speed to the idling speed.

The fuel injected during cranking may be ignited near the end of the first compression stroke following the start of cranking. In the case of misfiring during cranking, the injected fuel may go in any, or in a combination of routes: (a) accumulated in the cylinder and burned during the subsequent cycle or cycles; (b) discharged with the exhaust gases and deposited on the surfaces of the exhaust system; (c) emitted from the engine in the form of unburned hydrocarbon vapor or fuel, or in the form of liquid particulates appearing as white smoke, or (d) reaching the cylinder walls and leaking between the piston and cylinder to the crankcase. The fuel which is accumulated and burned during subsequent cycle(s) may result in spikes of high cylinder gas pressure and cause increased engine wear particularly at the relatively low cranking and starting speeds. The unburned fuel which is discharged from the cylinder results in an increase in the undesirable particulate and hydrocarbon or unburned fuel emissions from the engine. The fuel which leaks to the crankcase may dilute the lubricating oil and increase friction and wear in the engine.

Thus, it would be desirable to provide a method and apparatus for controlling the injection of fuel into various types of combustion engines during cranking of the engine which overcomes the aforementioned problems. It would also be desirable to provide a method and apparatus for controlling the injection of fuel during cranking of a combustion engine which can be easily installed in any new engine or retro-fitted onto any existing engine without undue modification of the engine. Finally, it would be desirable to provide a method and apparatus for controlling the injection of fuel during cranking of a combustion engine which can be implemented internally or externally in many types of mechanical or electronic fuel injection systems without adding additional devices or apparatus.

SUMMARY OF THE INVENTION

The present invention is a method and an apparatus for controlling the injection of fuel into combustion engines, such as a diesel engine, during cranking.

The method includes the steps of starting the cranking of the engine and controlling the injection of fuel into the engine by delaying its delivery and/or adjusting its amount for a specified period of time or until one or more operating parameters, such as the engine rotational speed, the rotational angle of the crankshaft or the combustion gas chamber pressure reaches a predetermined level.

The method of the present invention also includes injecting the fuel at the proper or maximum amount required for optimal starting of the engine when the selected engine operating parameter(s) such as the engine rotational speed, the rotation angle of the crankshaft or the compression pressure in a cylinder or cylinders reaches a predetermined value. Alternately, the fuel may be injected at a predetermined changing or fixed rate by the injecting means beginning with the start of cranking of the engine until the end of a predetermined time period or until one or more of the engine parameters reaches a predetermined level.

The apparatus required to perform such a method includes means for sensing the start of engine cranking, and means for delaying the injection of an optimum amount of fuel required for engine starting into the engine until one or more engine operating parameters, such as the engine rotational speed and/or the rotation angle of the crankshaft and/or the cylinder compression pressure has reached predetermined levels or values. In one version of the apparatus, the delaying means delays the injection of fuel into the engine for a predetermined time period after the start of cranking of the engine. The fuel is then injected into the engine at the proper or maximum amount required for optimum engine starting conditions. This is after the engine rotational speed and/or the crankshaft rotation angle and/or the combustion chamber gas compression pressure and/or any other operating parameter of the engine have reached their respective predetermined values and positions. In an alternate embodiment, the delaying means delays the injection of the proper or maximum amount of fuel into the engine, but begins to inject fuel at a changing or fixed rate beginning with the start of cranking to the optimum amount of fuel required for starting of the engine at the end of a predetermined time period after the start of cranking of the engine.

In both the method and apparatus of this invention, the proper or maximum amount of fuel injected into the engine is delayed for a predetermined time period after the start of cranking of the engine. This reduces the discharge of unburned hydrocarbons or fuel from the cylinder(s), liquid or solid particulates and the common white smoke emitted from diesel engines during starting. This also reduces the wear on the engine since the unburned fuel could affect lubricating oil film as it leaks from the cylinder and mixes with the oil in the crankcase of the engine.

BRIEF DESCRIPTION OF THE DRAWING

The various features, advantages and other uses of the present invention will become more apparent by referring to the following detailed description and drawing which describe and illustrate the invention by way of example only in a diesel engine in which:

FIG. 6 is a schematic diagram showing the controller employed in the present invention to delay the amount of maximum fuel injection into a diesel engine.

DESCRIPTION OF THE PREFERRED EMBODIMENTS

Figure 1:
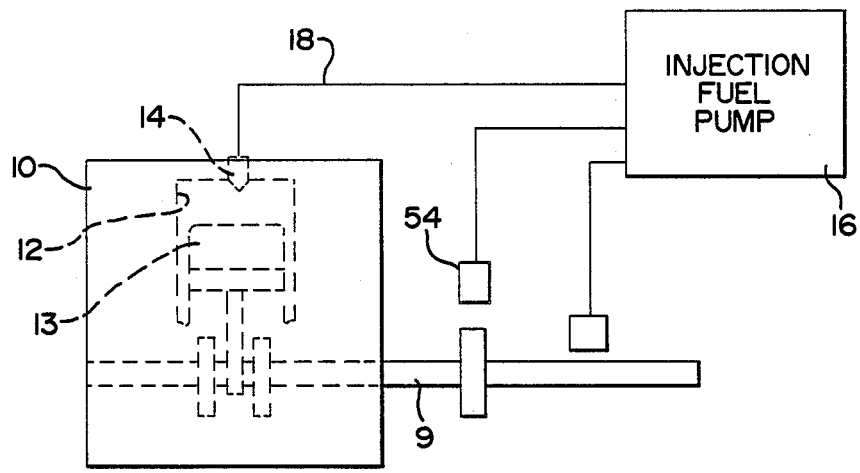
FIG. 1 is a diagrammatic view of a typical diesel engine employing the cranking fuel control method and apparatus of the present invention.

Throughout the following description and drawing, an identical reference number is used to refer to the same component shown in multiple figures of the drawing.

Referring to the drawing, there is illustrated a cranking fuel control method and apparatus for use in a combustion engine which delays the injection of fuel into one or more cylinders of an engine and/or controls the amount of fuel injected during cranking of the engine for a predetermined period of time after start of cranking until one or more predetermined engine operating parameters such as the engine rotational speed, the rotation angle of the crankshaft and/or the cylinder gas compression pressure have reached predetermined values.

In order to understand the operation and advantages afforded by the present invention, a general description of a conventional diesel engine will be first provided. It will be understood that such a description is by example only and is not intended to limit the use of the present invention, either in the method or device form on other types of internal combustion engines.

Figure 2:
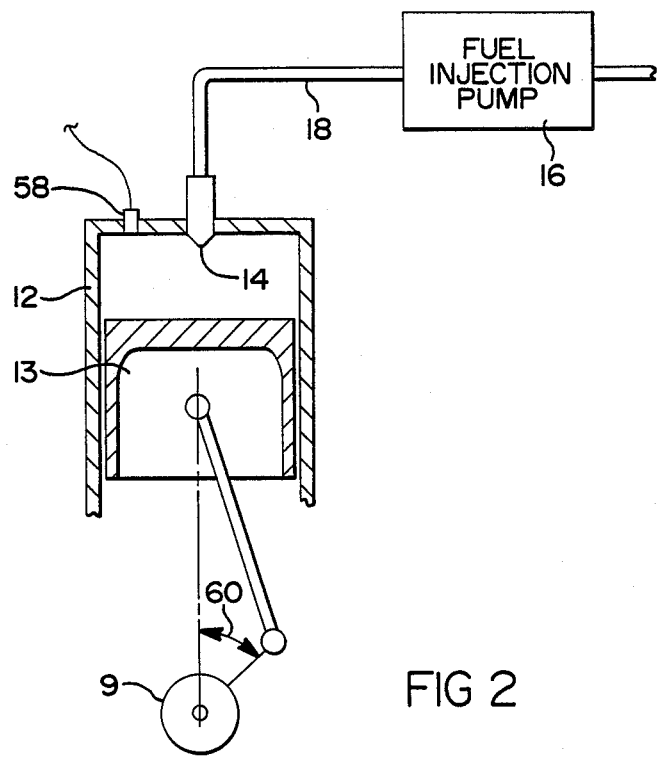
FIG. 2 is an enlarged cross-sectional view of a cylinder in the engine shown in FIG. 1.

As shown in FIGS. 1 and 2, a typical diesel engine includes a cylinder block 10 which is provided with one or more cylinders 12. The cylinders 12 are mounted within the engine block 10 in a conventional manner and may be provided in any number, such as 1, 2, 3, 4, etc., depending upon the desired engine size. By way of example only, the present invention will be described with only one cylinder 12 shown in FIG. 2. However, it will be understood that the present invention may be employed in one or more cylinders of a multi-cylinder engine.

As shown in FIG. 2, cylinder 12 has a reciprocating piston 13 movably disposed therein. The piston 13 is connected to a conventional crankshaft 9 which is connected to a load. As an example, the crankshaft 9 can be connected to the drive shaft of a vehicle in which the engine 10 is mounted. The engine 10 is provided with a fuel injector 14 which injects fuel under high pressure into the cylinder 12. The injector 14 is of conventional construction and is connected in fluid flow communication to a fuel injection pump 16 via a high pressure fuel line 18. This provides fuel to the injector 14 from a fuel supply source, not shown.

It should be noted that conventional filters, regulators, etc., which are used in combustion engines are not shown in FIG. 1 since such components are and their usage are well known.

The present invention may also be applied to other fuel injection systems. These systems include, but are not limited to, a unit injector in which the pump 16 is directly connected to the injector 14 without a conduit 18 or a rotary injection pump in which one pumping unit compresses the fuel and a distributor distributes it to the various injectors.

Figure 3:
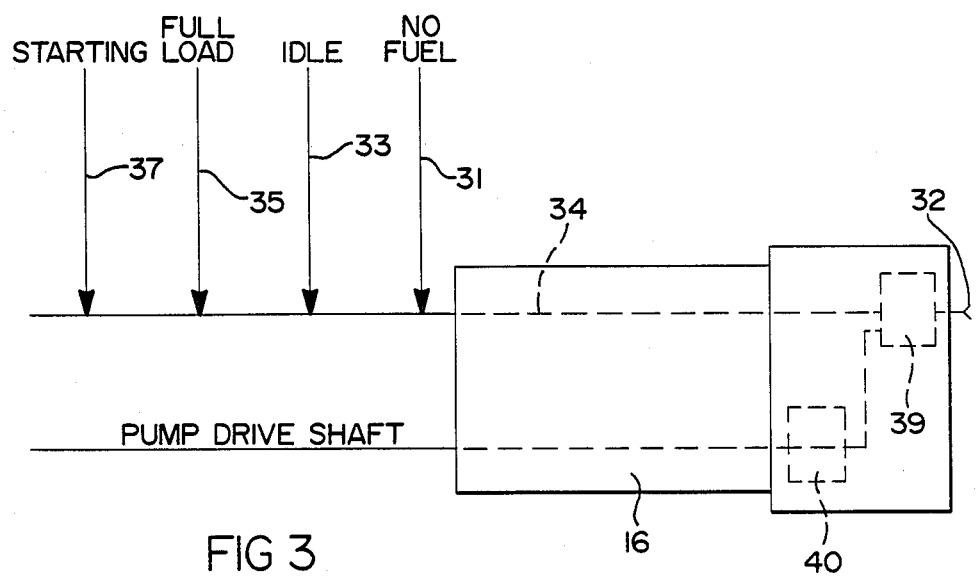
FIG. 3 is a schematic representation of a diesel injection pump and the rack positions during the different operating modes of the engine.

FIG. 3 shows a schematic representation of a fuel injection unit in which a single pumping unit is used for each injector 14. The position of the plungers (not shown) in each pumping unit is controlled by a rack 34. The amount of fuel delivered by the pump 16 to the injector 14 is controlled by the fuel rack 34 which is connected to a linkage 32 controlled by a mechanical governor 40. This is by way of example only as various types of fuel control systems may also be employed with the present invention as described hereafter. The position of the fuel rack 34 depends upon the operating mode of the engine and four discrete operating modes 31, 33, 35 and 37 are illustrated in FIG. 3.

Reference number 31 depicts the postion of the fuel rack 34 in a no fuel or engine stopping position. Reference number 33 depicts a fuel rack 34 position during idling of the engine; while reference number 35 depicts a fuel position during a full engine load condition. Finally, reference number 37 depicts the position of the fuel rack 34 during starting or cranking of the engine.

Figure 4:
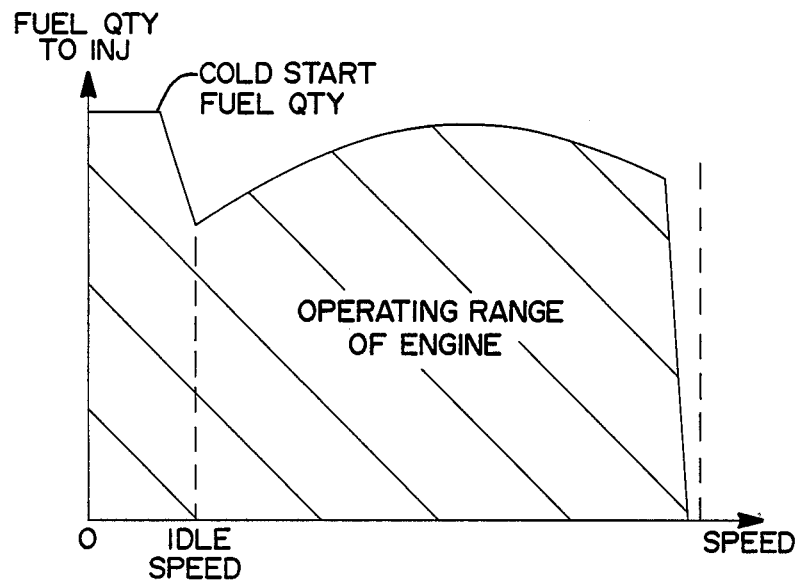
FIG. 4 is a graph showing the amount of fuel injected into a conventional diesel engine during different operating modes.

Referring to FIG. 4, there is shown a graph illustrating the typical amount of fuel injected into a cylinder of a diesel engine. In this graph, there is depicted the quantity of fuel input by the injectors 14 at the start of cranking of the engine. The quantity of fuel input by the injectors 14 drops off during idle of the engine and is adjusted through the operating range of the engine to a certain level depending on its speed and load.

Figure 5:
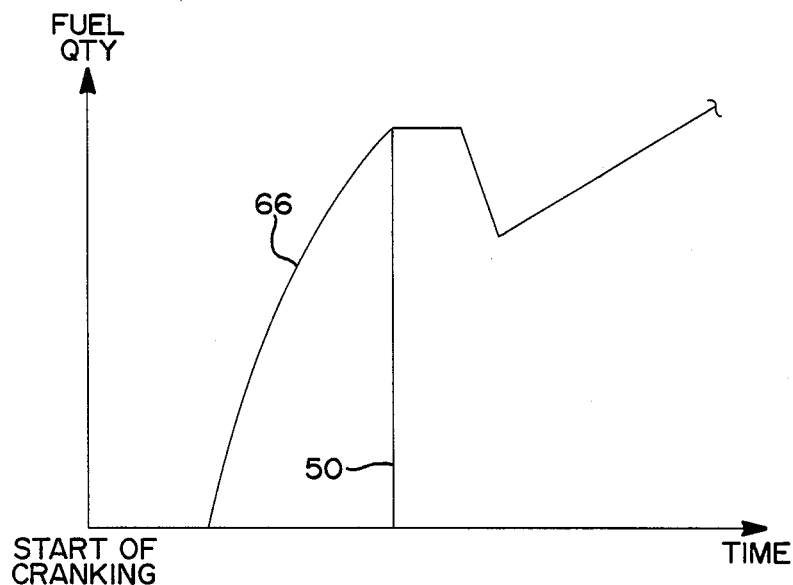
FIG. 5 is a graph showing the operation of the present method and apparatus in delaying the injection of fuel in the engine for a predetermined time period after the start of the cranking of the engine.

According to the present invention, means are provided for delaying injection of fuel into the cylinder 12 after the start of cranking the engine for a predetermined period of time. As shown in FIG. 5, this time delay, depicted by reference number 50, prevents the input of large quantities of fuel into the cylinder 12 for a predetermined period of time. This period of time is related to one or more engine operating parameter such as a predetermined speed of the engine, the rotation of the crankshaft 9 to predetermined angle or the cylinder gas compression pressure reaching a predetermined value. This prevents injection of fuel into a cylinder 12 which may cause misfiring or poor burning resulting in the emission of unburned hydrocarbons, fuel or liquid and/or solid particulates from the engine and the appearance of white smoke. Some unburned fuel may also reach the cylinder walls and the crankcase resulting in increased engine wear.

Figure 7:
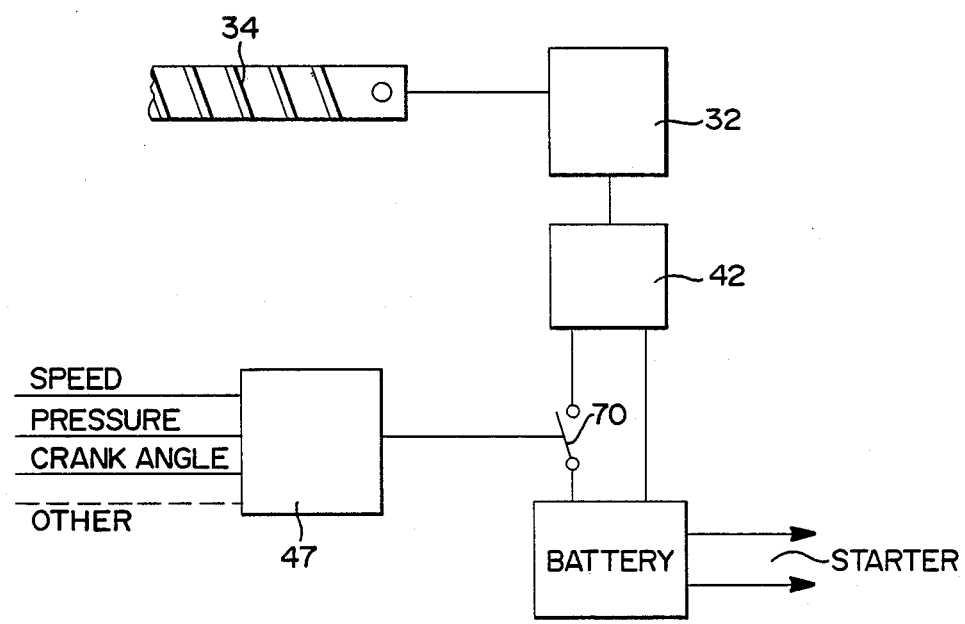
FIG. 7 is a partial, schematic diagram showing another embodiment of the present invention.

Referring now to FIG. 7, there is shown an embodiment of the present invention in which a control unit 47 which could be a mechanical unit or an electronic unit formed of logic gates, etc., responsive to one or more of the engine operating parameters is used to close a switch 70 connected between the engine battery and a solenoid 42. Upon closing of the switch 70, the solenoid 42 is actuated which moves the linkage 32 and the fuel control rack 34 to provide the desired quantity of fuel to the injector 14.

As shown in FIG. 6, a central processing unit 43 containing an internal memory stored program is used for controlling the injection of fuel to each cylinder 12. The CPU 43 may be of conventional construction and since its internal structure and operation are well known it will not be described herein.

The CPU 43, as shown in FIG. 6, receives various inputs, such as an input 52 from an engine starter origination switch. Additional inputs may include one or more of the following: an indication of the engine speed from a conventional speed transducer 54 mounted on the engine, the fuel rack position 56, the cylinder gas compression pressure 58, the crankshaft rotation 60 and the operator fuel pedal position 62. Other inputs which indicate directly or indirectly the engine speed, rotation angle of the crankshaft or the cylinder gas compression pressure can also be used. For example, the engine oil pressure may be used as an input to indicate engine speed during cranking and starting of the engine.

The CPU 43 in response to one or more of the various inputs 52, 54, 56, 58 and 62 provides an output signal 64 to the rack 34 and thereby controls the quantity of fuel delivered to the injector 14. In this embodiment, the CPU 43 delays the input of fuel through the injector 14 until one or more of the engine operating parameters has reached a predetermined value.

A start engine override signal 68 is connected to the CPU 43 to enable the engine to be started in case of malfunction of the cranking fuel control unit. This enables the engine 10 to be started in a conventional manner without any time delay or fuel control as described in this invention.

In an alternate embodiment, the rate of fuel injection can be adjusted to suit the specific engine type. For example, as shown in the graph in FIG. 5 by reference number 66, the fuel is injected under CPU 43 control in a gradually increasing manner upon the start of or shortly after cranking of the engine 10 as described above.

In summary, there has been disclosed a unique cranking fuel control for diesel and other types of internal combustion engines which delays and controls the input of the amount of fuel injected into the engine for a predetermined amount of time after the start of cranking of the engine. This not only minimizes the emission of unburned fuel in the form of unburned hydrocarbons, liquid and/or solid particulates and white smoke; but also reduces wear on the engine parts caused by mixing of the fuel with the engine lubricating oils or by the high gas pressures reached in some engines upon firing, which the engine speed is low and the lubricating oil film has not formed sufficiently to separate the interacting surfaces in the different parts of the engine.

What is claimed:

1. A method for controlling the injection of fuel into a combustion engine, the combustion engine operating at substantially a full operating load at a time interval after ignition of the engine, comprising the steps of:
   restricting the amount of the fuel injected into the combustion engine after engine cranking starts to substantially zero for a predetermined amount of time; and
   delaying the injection of fuel into the combustion engine at the full operating load of the combustion engine for a predetermined amount of time after engine cranking starts, until the injection of fuel at the full operating load of the combustion engine is appropriate.

2. The method of claim 1 wherein the injection of fuel is delayed until an engine operating parameter has reached a predetermined value.

3. The method of claim 2 wherein the fuel is injected at the full operating load of the combustion engine when the cylinder compression pressure reaches a predetermined value.

4. The method of claim 1 further including the steps of:
   sensing the rotational speed of the engine;
   sensing the crankshaft rotation angle of the crankshaft of the engine; and
   sensing the engine cylinder gas compression pressure.

5. The method of claim 1 wherein the restricted fuel injected is gradually increased at a predetermined rate after the start of the cranking of the engine.

6. An apparatus for controlling the injection of fuel into a combustion engine, the combustion engine operating at substantially a full operating load at a time interval after ignition of the engine, comprising:
   means for restricting the amount of the fuel injected into the combustion engine after engine cranking starts to substantially zero for a predetermined amount of time; and
   means for delaying the injection of fuel into the combustion engine at the full operating load of the combustion engine for a predetermined amount of time after engine cranking starts, until the injection of fuel at the full operating load of the combustion engine is appropriate.

7. The apparatus of claim 6 wherein the delaying means includes means for sensing when one engine operating parameter has reached a predetermined value.

8. The apparatus of claim 7 wherein the engine operating parameter is the engine cylinder gas compression pressure.

9. The apparatus of claim 6 wherein the means for delaying further includes:
   means for sensing the rotational speed of the engine;
   means for sensing the crankshaft rotation angle of the engine; and
   means for sensing the engine cylinder gas compression pressure.

10. The method of claim 1, further comprising overriding the start signal after a specified amount of time to guard against a malfunction in the sensor circuit.

11. The apparatus of claim 6, wherein the fuel is injected into a cylinder of the engine.

12. The method of claim 1, further comprising initially sensing the start of cranking of the engine.

13. The method of claim 1, wherein the internal combustion engines include gasoline, and diesel engines.

14. The apparatus of claim 6, further comprising means for sensing the start of cranking of the engine.

15. The apparatus of claim 6, wherein the internal combustions engines include gasoline, and diesel engines.

* * * * *